No. 694,474. Patented Mar. 4, 1902.
A. L. HOCKETT.
COTTON CHOPPER.
(Application filed Jan. 24, 1901.)
(No Model.)

Witnesses
Inventor
Aaron L. Hockett
By L. Deane Son
Attorneys

UNITED STATES PATENT OFFICE.

AARON L. HOCKETT, OF MASTODON, MISSISSIPPI.

COTTON-CHOPPER.

SPECIFICATION forming part of Letters Patent No. 694,474, dated March 4, 1902.

Original application filed December 14, 1899, Serial No. 740,278. Divided and this application filed January 24, 1901. Serial No. 44,531. (No model.)

*To all whom it may concern:*

Be it known that I, AARON L. HOCKETT, a citizen of the United States, residing at Mastodon, in the county of Panola and State of Mississippi, have invented certain new and useful Improvements in Cotton-Choppers; and I do hereby declare the following to be a full, clear, and exact description of the invention, such as will enable others skilled in the art to which it appertains to make and use the same.

My present invention relates to a novel cotton-chopper, and more particularly to novel means for supporting and operating the shaft of the chopping-wheel.

The object of the invention is to provide a simple, durable, and readily-adjustable supporting-frame for retaining chopping-wheel shaft at an angle with respect to the axle of the supporting-vehicle.

To the accomplishment of this end the invention consists in the novel construction and arrangement hereinafter described, illustrated in the accompanying drawings, and succinctly pointed out in the appended claims.

Figure 1:
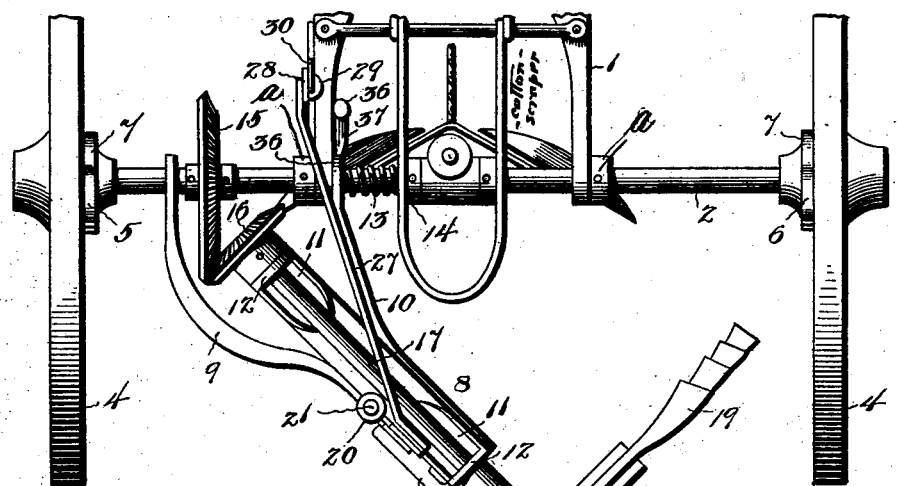
Figure 3:
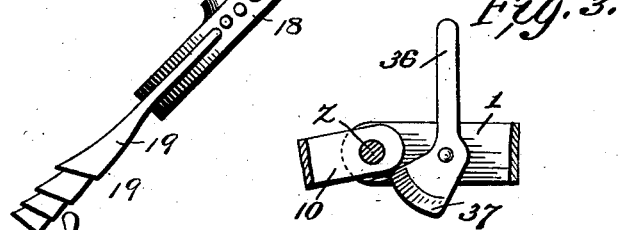
Figure 2:
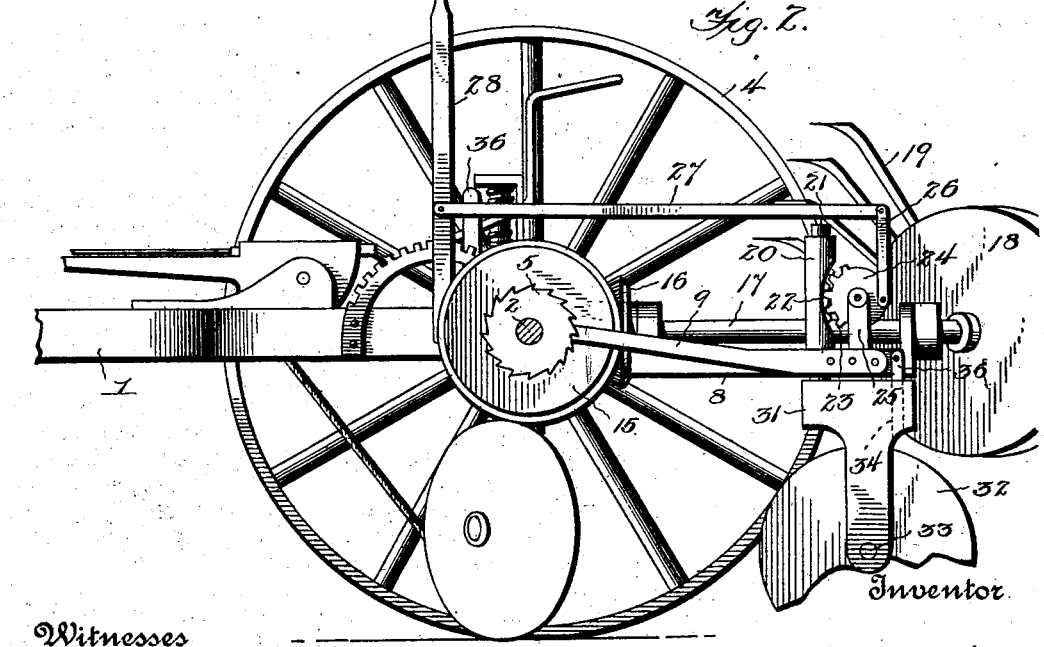

Referring to the drawings, Figure 1 is a plan view of my chopper, and Fig. 2 is a sectional elevation thereof. Fig. 3 is a fragmentary view showing lever 36 and contiguous parts in elevation.

The reference-numeral 1 designates a yoke constituting the main frame of the machine and provided at its rear ends with bearings for an axle 2, upon which are loosely mounted carrying and driving wheels 4.

The numerals 5 and 6 designate ratchet-wheels fixed upon the axle 2, one adjacent to and concentric with each of the wheels 4, which latter are each provided with a spring-pressed pawl 7, adapted to engage the ratchet-wheels to cause the axle to revolve with the wheels or to be disengaged from the ratchets when it is desired to move the machine without operating the chopping mechanism.

8 designates a frame for supporting the chopping-wheel shaft and comprising a block or body portion of wood and metal arms or straps 9 and 10 for securing the frame 8 to the axle at an angle to the latter. The arm 9 is curved, as shown, and the forward ends of both arms 9 and 10 are formed with openings, through which extends the axle 2. Upon the frame 8, which is grooved or hollowed out on its upper surfaces, are arranged semicircular bearings 11, provided with annular bearing flanges or rings 12.

The yoke 1 is adapted to turn upon the axle 2; but it is prevented from moving longitudinally thereof by collars *a*, pinned to said shaft and abutting the yoke. The arms 9 and 10 are capable of sliding longitudinally of the shaft 2 to move a bevel-gear 16, to be described, into and out of mesh with a drive-gear 15, secured to the shaft 2. The arm 10 extends in between one fork of the yoke 1 and a collar 14, fixed to the axle. A spiral spring 13, surrounding the axle 2, interposed between this collar and the arm 10, serves to exert a tension to hold the gears before mentioned in mesh. To disengage the gears, the arm 10 is pushed back against the tension of the spring, which shifts the frame 8 laterally and moves the gear 16 out of mesh with the gear 14. This action is accomplished by a lever 36, pivoted to the yoke 1, as shown in Fig. 1, having a cam end that enters between said arm and the adjacent face of the yoke 1 as the lever 36 is operated and wedges or crowds the arm 10 back against the tension of the spring.

Upon the axle 2 between the arms 9 and 10 is secured a bevel gear-wheel 15, which meshes with a bevel gear-pinion 16, mounted upon the front end of a shaft 17, which is revolubly supported within the bearings 11 of the frame 8. Upon the rear end of this shaft 17 is mounted the chopping-wheel, which comprises a hub 18 and radially-projecting hoes or chopping-blades 19, arranged in groups, the spaces between the groups being determined by the character of the work.

At one side of the frame 8 and secured thereto by the arm 9 is a sleeve 20, having a longitudinal slot at its rear side. Within this sleeve is loosely supported a vertical shaft 21, formed at its rear side with a series of depressions 22 to receive teeth 23, projecting from a toothed segment 24, pivotally secured to a bracket 25, projecting from the frame 8 and having a lever-arm 26 connected by a rod 27 with a lever 28, fulcrumed upon the yoke-frame 1 and having a pawl 29 and finger-piece 30 coöperating with a ratchet-segment secured to the main frame. The shaft 21 projects from a bracket 31, having parallel ears between which is mounted a feed-wheel 32 upon a shaft 33. The rear end of the bracket 31 is formed with a loop or eye 34, into which projects a guide-pin 35, depending from the frame 8 and serving to guide the bracket 31 in its vertical movement.

The present application is a division of an application filed by me December 14, 1899, Serial No. 740,278.

I claim—

1. In a cotton-chopper, the combination with the driving-wheels and axle and hilling means supported therefrom, of a chopping-wheel, a shaft carrying the same, driving means interposed between said shaft and the axle, and a frame supporting said shaft comprising a block and supporting-arms extending therefrom secured to the axle and shiftable thereon, means for shifting said frame in one direction and means for returning the same, substantially as described.

2. In a machine of the class described, a chopping-wheel comprising a hub and a plurality of radially-projecting blades arranged in a series of groups, each blade comprising a stem fitted in said hub and a wide free end forming a continuation of the stem.

3. In a cotton-chopper, the combination with a chopping-wheel shaft and the main frame, of a frame for supporting said shaft comprising a block and arms, a bracket, a vertically-adjustable feed-wheel mounted therein, a slotted sleeve secured to the block by one of said arms, a shaft extending into the sleeve from the bracket, and means for adjusting the shaft.

In testimony whereof I affix my signature in presence of two witnesses.

AARON L. HOCKETT.

Witnesses:
W. H. WALL,
W. D. WALL.